United States Patent
Bonnet et al.

(10) Patent No.: US 6,176,728 B1
(45) Date of Patent: Jan. 23, 2001

(54) CONNECTING DEVICE FOR LARGE CABLE-TO-CARD CONNECTORS

(75) Inventors: Yves Bonnet, Saint Laurent du Var; Jacques Cresp, Nice; Jean-Pierre Suzzoni, Cagnes sur Mer; Jean-Marie Limon, Roquefort les Pins; Bruno Centola; Dominique Baron, both of Vence, all of (FR)

(73) Assignee: International Business Machines Corporation, Armonk, NY (US)

( * ) Notice: Under 35 U.S.C. 154(b), the term of this patent shall be extended for 0 days.

(21) Appl. No.: 09/096,944

(22) Filed: Jun. 12, 1998

(30) Foreign Application Priority Data

Jun. 27, 1997 (EP) .................................................. 97480039

(51) Int. Cl.<sup>7</sup> ................................................ H01R 13/627
(52) U.S. Cl. ......................... 439/362; 361/800; 439/939
(58) Field of Search .................................. 439/607, 362, 439/939, 372, 373; 174/35 R; 361/796, 799, 800, 803, 816, 818

(56) References Cited

U.S. PATENT DOCUMENTS

| 4,744,006 | 5/1988 | Duffield . |
| 5,256,085 | * 10/1993 | Tan ........................................ 439/607 |
| 5,317,105 | 5/1994 | Weber . |
| 5,401,183 | * 3/1995 | Tan ........................................ 439/362 |
| 5,472,355 | 12/1995 | Wittmann . |
| 5,709,569 | * 1/1998 | Buck .................................... 439/607 |

FOREIGN PATENT DOCUMENTS 531228    12/1940   (DE) .

OTHER PUBLICATIONS

"Multi–port I/O connector cable" IBM Technical Disclosure Bulletin, vol. 28, No. 5, Oct. 1985 (1985–10), pp. 1998–2000, XP00208105.

* cited by examiner

Primary Examiner—Neil Abrams
Assistant Examiner—Javaid Nasri
(74) Attorney, Agent, or Firm—John B. Frisone; Joscelyn G. Cockburn

(57) ABSTRACT

The connecting device includes a securing plate and locking spring attached to the cable connector of the cable-to-card connectors. The connecting device is pressed, when the connectors are mated, by the front portion of the cable connector against the host machine chassis which in turn is pressed flat against the adapter card brackets. In a preferred embodiment the connecting device is attached on the front portion of a standard cable connector with removable fastener, in particular with a locking spring. In another embodiment, the connecting device is an integral part of the cable connector.

12 Claims, 8 Drawing Sheets

FIG. 1
Prior Art

FIG. 2
FINAL ASSEMBLY
Prior Art

FIG. 3
(PROBLEM DESCRIPTION IN A CONVENTIONAL CONNECTOR)

FIG. 4
(PROBLEM DESCRIPTION IN A CONVENTIONAL CONNECTOR)

FIG. 5
FINAL ASSEMBLY

FIG. 7
ASSEMBLY OPERATIONS

FIG. 8
ASSEMBLY OPERATIONS

CONNECTING DEVICE FOR LARGE CABLE-TO-CARD CONNECTORS

TECHNICAL FIELD

The present application relates to cable-to-card connectors and, more particularly, to a device for improving both Electro Magnetic Compatibility (EMC) and mechanical strength of large input/output connectors connected to Adapter Cards within a host machine such as a workstation, a personal computer, a network node, etc.

BACKGROUND ART

Cable-to-Card Connectors

The workstation and personal computer market drives numerous manufacturers to provide specialized Add-On cards, called Adapter Cards, aimed at providing specific functions and attachments to various networks, computers, peripherals, and other systems (called External Devices). Many of these Adapter Cards are equipped with large Input/Output (I/O) connectors for transmitting to said External Devices the high number of signals often used by today applications. Most workstations, personal computers or other systems (called Host Machines) provide one or more slots for plugging Adapter Cards. A slot consists of free room in the host machine housing (also called chassis), associated with:

an Adapter Card, electrical means (called Card Connector) for connecting the Adapter Card with the host machine circuitry, and an opening in the host machine housing for plugging an external Cable Connector to the Adapter Card.

Figure 1:
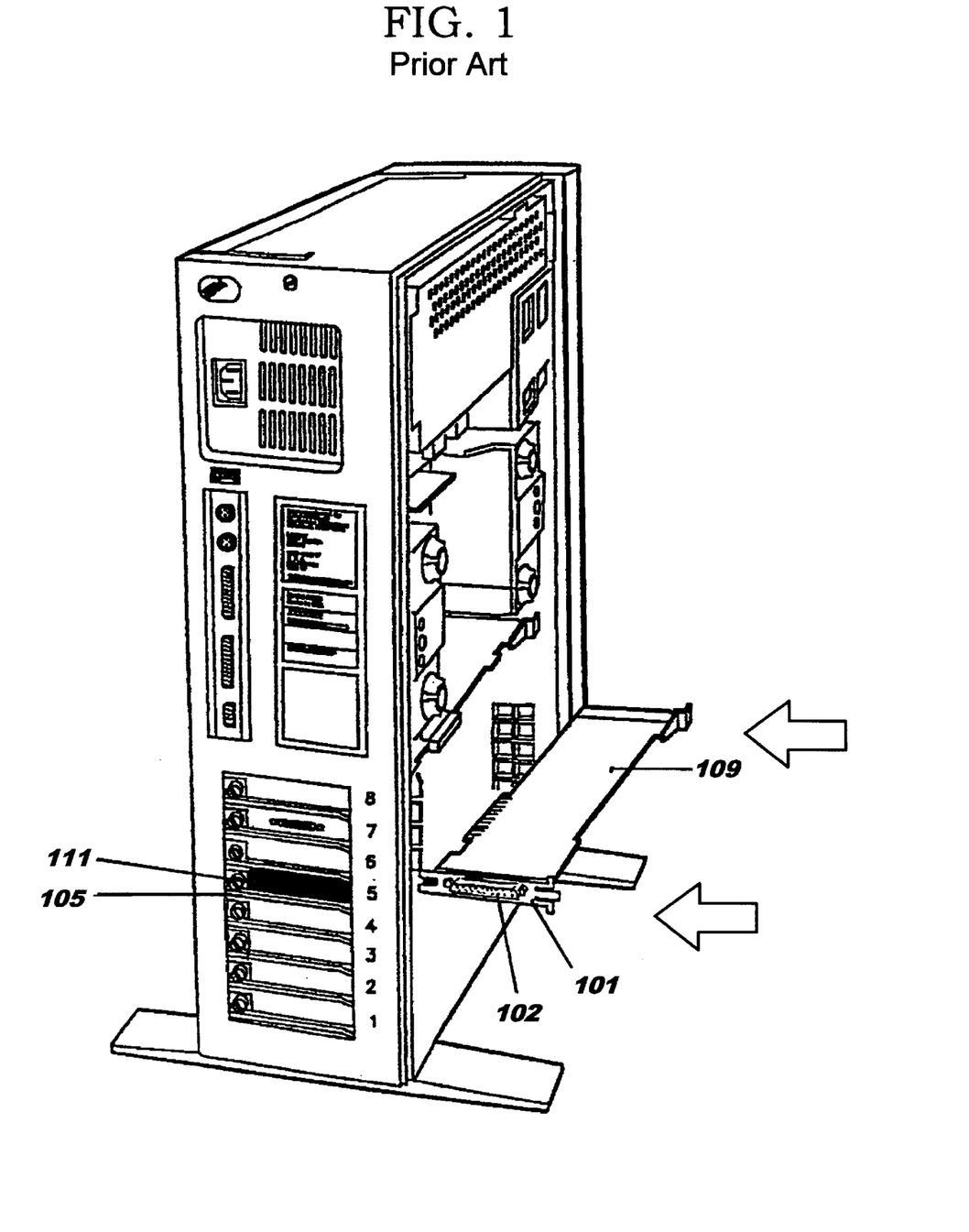
FIG. 1 shows a conventional host machine with Adapter Cards.

Electrical and mechanical characteristics of host machines slots as well as corresponding Adapter Cards are defined by diverse industry standards (ISA, EISA, Microchannel, PCI and others) which all have the same structure as far as Input/Output connector is concerned. As shown in FIG. 1, the Adapter Card Connector (102) is electrically and mechanically fastened to the Adapter Card Printed Circuit Board (PCB) (109). A Bracket (101) is assembled with the connector (102). The external Cable Connector (103) is fastened to the bracket by a pair of screws (104, 110) or other fastening means. The function of the Bracket is to obturate the slot opening (111) when the Adapter Card is slid into the host machine slot while having access to the Adapter Card Connector (102) from outside. The Bracket may include screws, groove and tongue joints or other fasteners depending on the different standards, for securing the Adapter Card in place in the slot. In addition to obvious safe and efficient operations, Adapter Cards have to comply with various standards:

National and International Authorities progressively enforce regulations on Electro Magnetic Compatibility (EMC) and the specifications are more and more stringent.

The mechanical interface between Adapter Card and External Device must fit with all existing and future machines of a given type or family and must follow all relevant specifications, including design points not adapted any more to the performance improvements of current products.

Electro Magnetic Compatibility (EMC)

Figure 2:
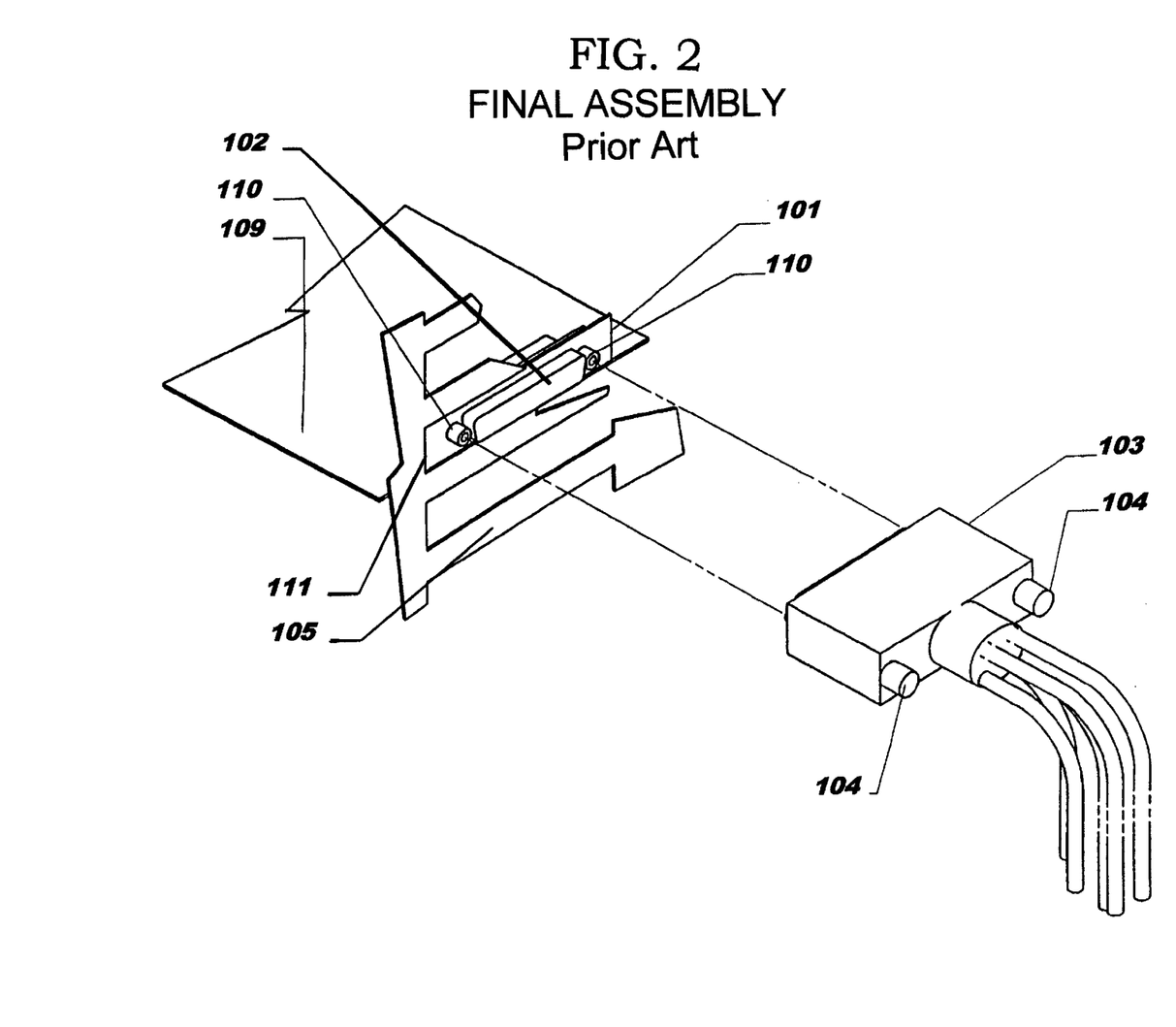
FIG. 2 is a general view in perspective of a conventional connector assembly comprising a Cable Connector and an Adapter Card installed in a host machine.

The assembly shown in FIG. 2 and comprising Cable Connector (103) and the Adapter Card Connectors (102), must provide an efficient containment of the Electro Magnetic Interference (EMI) and Radio Frequency Interference (RFI) within the host machine housing. At Adapter Card level, shielding continuity is ensured by the mechanical contact between the host machine chassis (105) and the shield of the Adapter Card Connector (102) through Bracket (101). Maximum shield efficiency is obtained when said contact is realized all around the connector (102), otherwise inner currents of the shield are mixed with outer currents and the following problems may occur:

Generation of an Electro Magnetic Interference (EMI) capable of disturbing other devices in the vicinity (TV, AM/FM), Increase of the Electro Magnetic Interference (EMI) susceptibility to external electromagnetic fields created by intentional emitters (Radio, TV, GSM, . . . ) or by non intentional sources (Car ignition, Electrostatic Discharges, coupling with noisy cables, . . . )

Consequently, an Adapter Card Connector (102), once installed, must be in contact with the Chassis (105) of the host machine, regardless of the mechanical efforts to which this connector is exposed to.

Mechanical Constrains

Depending on host machine design, slots can be either vertical or horizontal; so Adapter cards can be installed vertically or horizontally. Mechanical problems may occur in both cases:

Vertical Slots: When the Cable Connector is plugged in to the Adapter Card Connector, the output cable is primarily sensitive to horizontal impacts and constrains. This happens more particularly during the installation, configuration or maintenance of the host machine;

Horizontal Slots: When the Cable Connector is plugged in to the Adapter Card Connector, the output cable is primarily sensitive to vertical impacts and constrains, said constrains being amplified by the weight of the cable assembly.

Although the claimed invention can be used in both configurations, the configuration with horizontal Slots is the most sensitive.

Connector Installation

Figure 3:
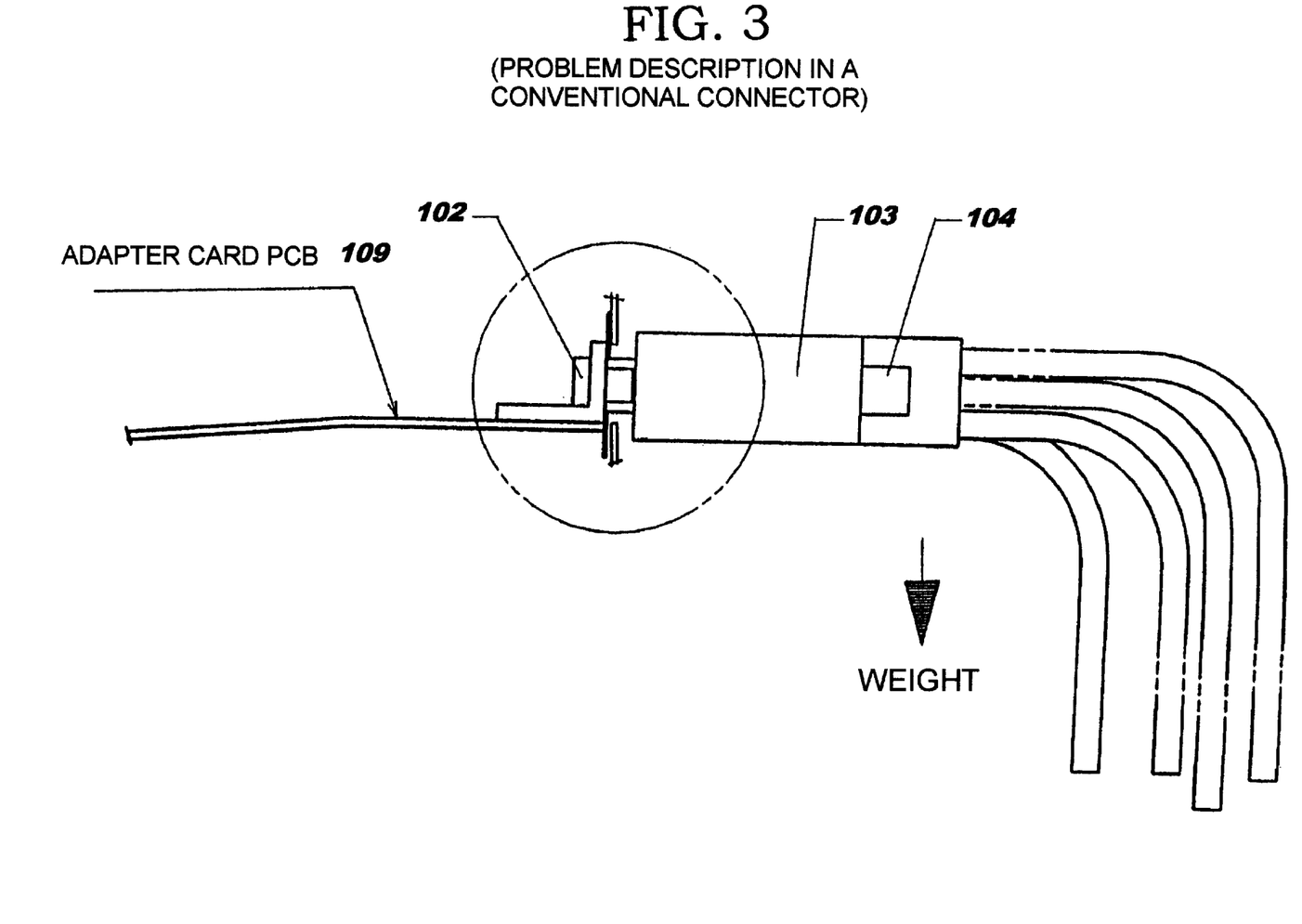
FIG. 3 is a cross section view illustrating the undesirable effects of the Cable Connector torsion force on a conventional connector assembly.
Figure 4:
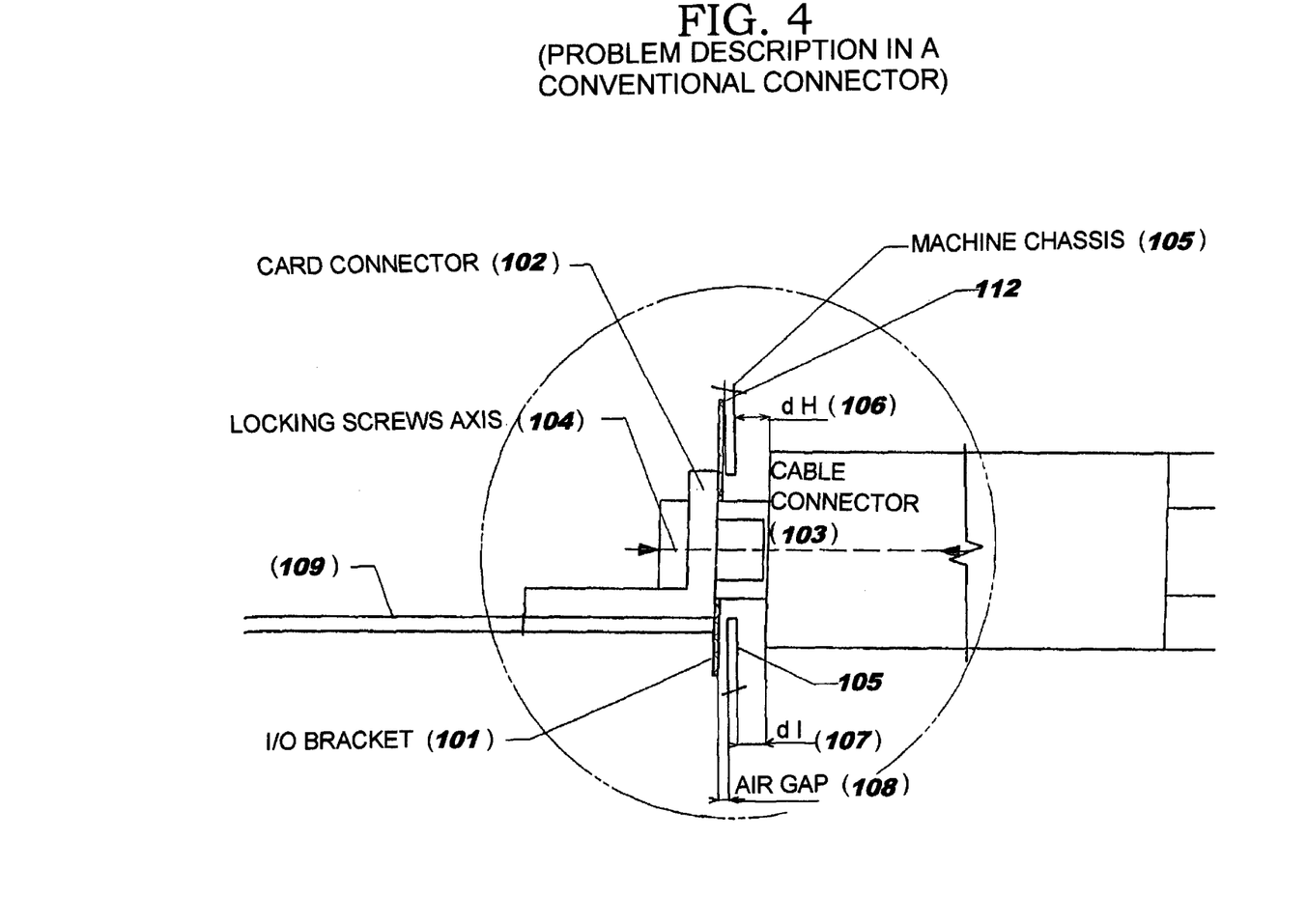
FIG. 4 is a detailed view the undesirable effects of the Cable Connector torsion force on a conventional connector assembly.

By construction, Adapter Card Brackets (101) and Adapter Card Connector (102) are fixed together as shown in FIGS. 2 and 3. The Cable Connector (103) is inserted in the Adapter Card Connector (102) and both are fastened together by means of one or a plurality of locking screws (104). As detailed in FIG. 4, the vertical force applied downwards to the Cable Connector (103) creates a torsion force at the contact point (112) of the host machine chassis (105) with the upper edge of the Bracket (101). This results in a rotational movement of the overall assembly around point (112):

The lower edge of Bracket (101) is pushed apart from the chassis of the host machine (105) reducing the space (dl, 107) between the chassis (105) and the bottom of the front portion of the Cable Connector (103). This mechanical constraint creates an interval or an air gap (108) between the Adapter Card Bracket (101) and the chassis (105) which dramatically impairs the electromagnetic properties of the assembly.

The Adapter Circuit Board (109) is bent within the host machine which creates a potential source of failure.

SUMMARY OF THE INVENTION

One object of the present invention is to improve the electro magnetic compatibility of a connector assembly. The connector assembly comprises:

a host machine chassis comprising at least one slot card connector mounted therein and at least one slot opening;

an adapter card mounted in said at least one slot card connector inside said host machine chassis, said adapter card being assembled with:
an adapter card connector directed to the slot opening comprising a terminal part with electrical contacts;
adapter card brackets for closing the slot opening and ensuring an electro magnetic continuity with the host machine chassis;
a cable connector comprising a terminal part with electrical contacts to be inserted through the slot opening in said card adapter connector.

The present invention relates to a connecting device characterized in that said connecting device is pressed, when the connectors are inserted, by the front portion of the cable connector against the host machine chassis which in turn is pressed flat against the adapter card brackets.

The pressure between the host machine chassis and the adapter card brackets is suitable for ensuring an electro magnetic contact all around the slot opening between the adapter card brackets and the host machine chassis.

A further object of the present invention is to improve the mechanical rigidity of the connector assembly.

In a preferred embodiment the connecting device is attached on the front portion of a standard cable connector with removable fastening means, in particular with a locking spring.

In another embodiment, the connecting device is an integral part of the cable connector.

DETAILED DESCRIPTION OF THE PREFERRED EMBODIMENT

General Principles

Figure 5:
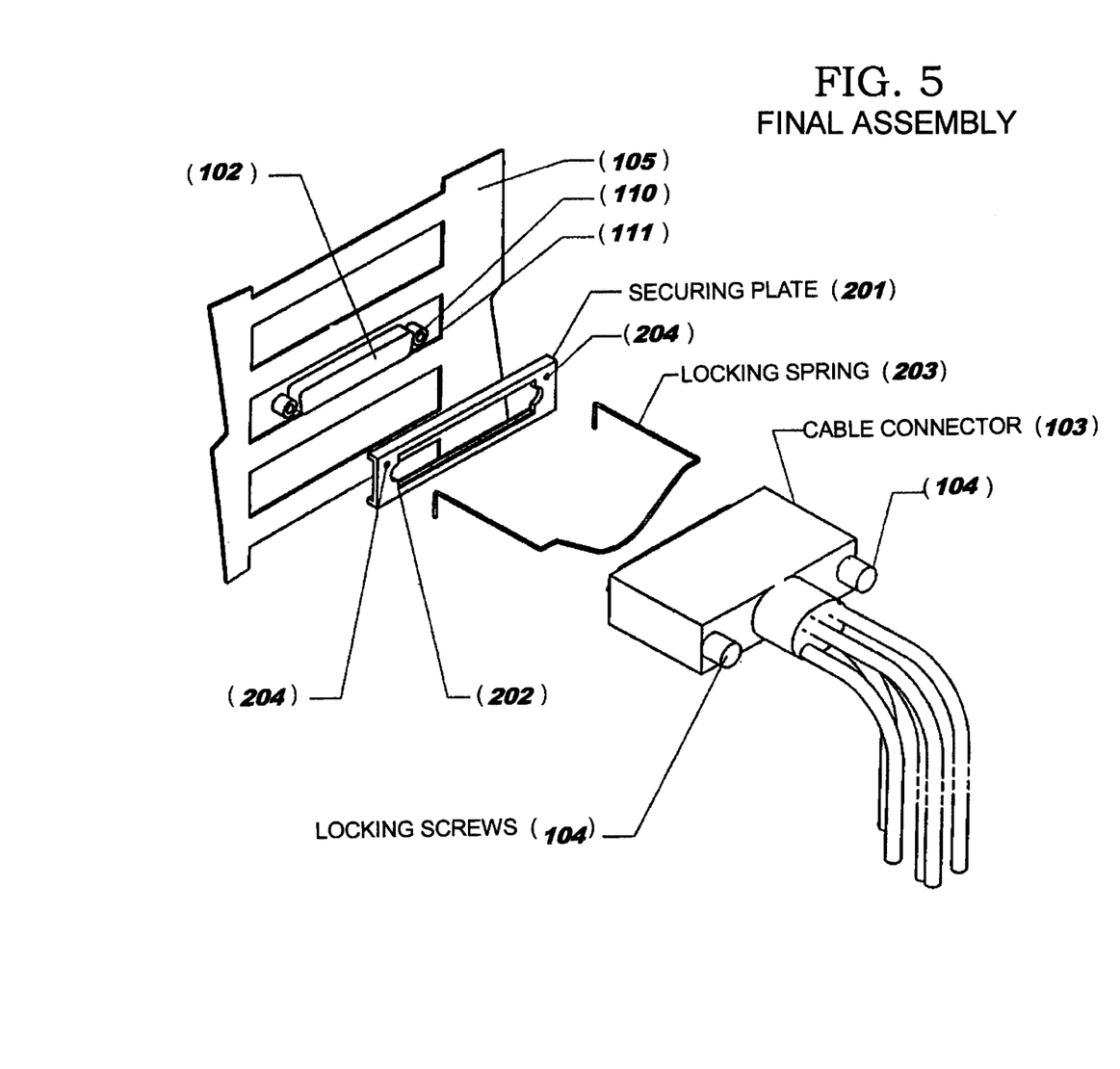
FIG. 5 is a view in perspective of the Securing Plate and its installation on the connector assembly according to the claimed invention.

The present application relates to a system with its different options, designed to improve both Electro Magnetic Compatibility (EMC) and mechanical strength of large cable-to-card connectors. Although said system is more specifically adapted to the Personal Computer environment, it can also advantageously be used on any type of machine; computers, line interface cassettes for large switching hubs, and others. As described in FIG. 4, the object of the present application is to prevent vertical or horizontal forces on the Cable Connector (103) from creating an air gap or a space interval (108) between the Adapter Card Bracket (101) and the chassis of the machine (105). Because the electromagnetic and mechanical properties of a connector assembly depend directly on said air gap, the claimed apparatus shown in FIG. 5, includes a particular device called Securing Plate for maintaining the Cable Connector (103) perpendicular to the chassis (105) independently of the forces applied to said Cable Connector (103). In other words, the purpose of the Securing Plate (201) is:

to maintain the upper and lower parts of the front portion of the Cable Connector at equal distance of the chassis (105) (dh=dl)

to ensure a tight contact between the Adapter Card Bracket (101) and the chassis (105).

Figure 6:
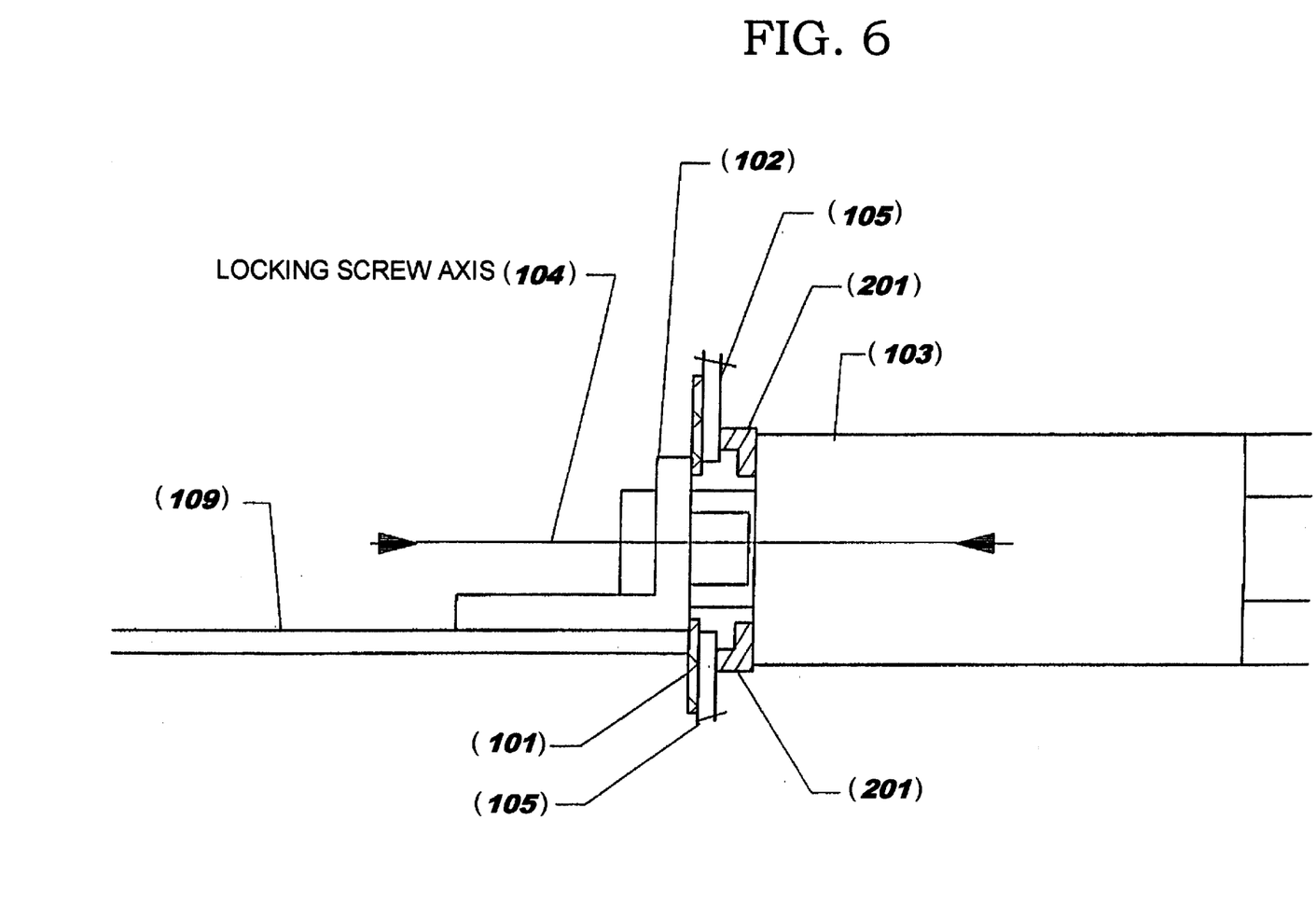
FIG. 6 is a cross section view of the connector assembly according to the claimed invention.

As shown in FIG. 6, the Securing Plate (201), located between the Cable Connector (103) and the chassis (105), acts as a washer for normally positioning male and mating female connectors (Cable (103) and Adapter Card Connectors (102) and for pressing flat the connector against the chassis. Once the Securing Plate is installed:

the Adapter Card Connector (102), the Chassis (105), the Securing Plate (201)

the Cable Connector (103)

are firmly pressed together with help of screws (104) or other fastening means so as to flatten the Adapter Card Bracket and the Securing Plate against the chassis.

Note: figures and dimensions given as example are based on the use of the following equipment and standards:

Cable Connector: ITT 2DD100P;

Adapter Card Connector: ITT 2DD100 SBR;

Adapter Card I/O Bracket: ISA;

Host machine: Personal Computer.

Securing Plate

The size of the Securing Plate is characterized in that the pressure generated between the host machine chassis and the Adapter Card Bracket is capable of ensuring an electro magnetic contact all around the slot opening, and is suitable for ensuring a mechanical rigidity to the connector assembly.

Thickness

As shown in FIG. 6, when the connector is plugged in, the Securing Plate (201) is pressed between the front portion of the Cable Connector (103) and the chassis of the host machine (105) which, in turn, is pressed flat against the Adapter Card Bracket (101). The thickness of the Securing Plate depends on connector manufacturer's specifications, the mechanical tolerance on the Adapter Card Bracket (101) and the thickness of the chassis (105).

Example: Securing Plate thickness=4.5 mm.

External Dimensions

The dimensions of the Securing Plate (201) must be roughly larger than the size of the slot opening (111) so as to ensure a significant pressure on the host machine chassis all around the slot opening.

Example: Securing Plate length=90 mm.

Cut Out

The Securing Plate (201) comprises a cut out (202) for allowing the insertion of the electrical contacts between the Adapter Card Connector (103) and the Cable Connector (102).

Example: D shell cut out.

Material

The Securing Plate (201) can be metal or any other resistant and stiff material.

Attaching Means

Securing Plates are intended to be installed on already existing (conventional, standard) Cable Connectors (103) without any specific tool or particular modification. In a preferred embodiment, as described FIGS. 5, a removable Locking Spring (203) attaches the Securing Plate (201) to the Cable Connector (103) and prevents any loss when the Cable Connector (103) is not plugged in.

However, Securing Plates can also be implemented as an integral part of specifically designed connectors. In that case, the Locking Spring (203), which is used only with detachable Securing Plates (201), is suppressed.

Installation and Operation

Figure 7:
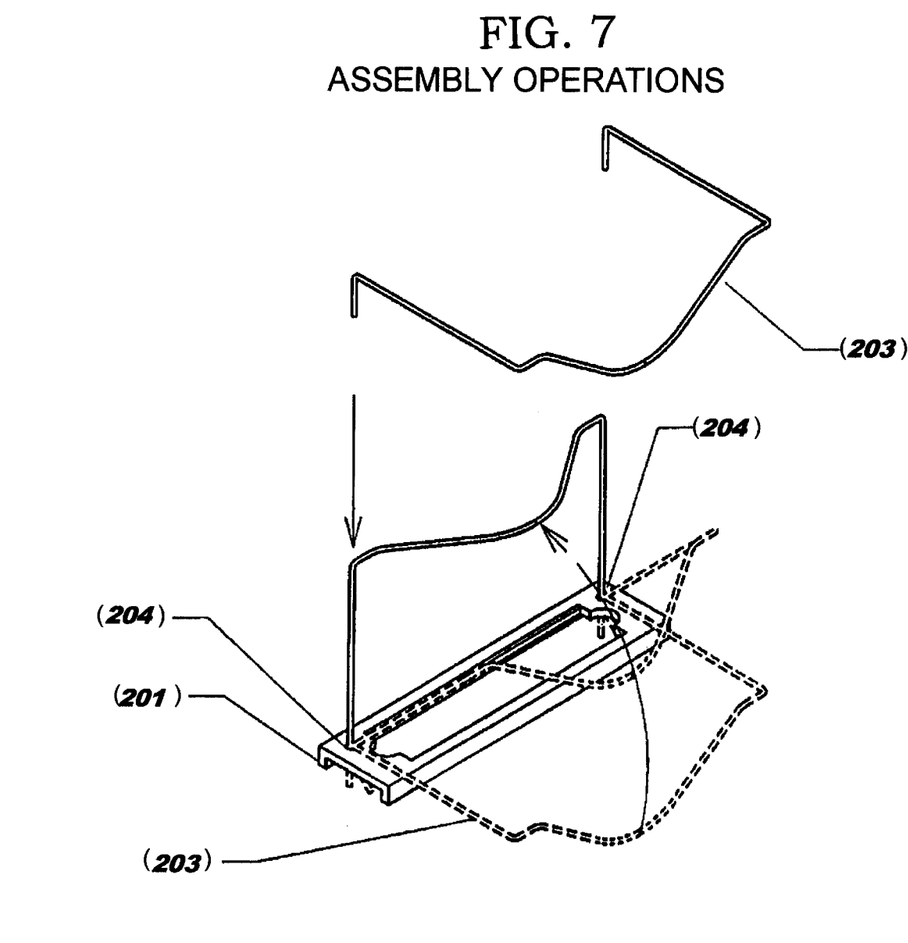
FIG. 7 shows a detailed view of the Locking Spring with its attachment on the Securing Plate according to the claimed invention.
Figure 8:
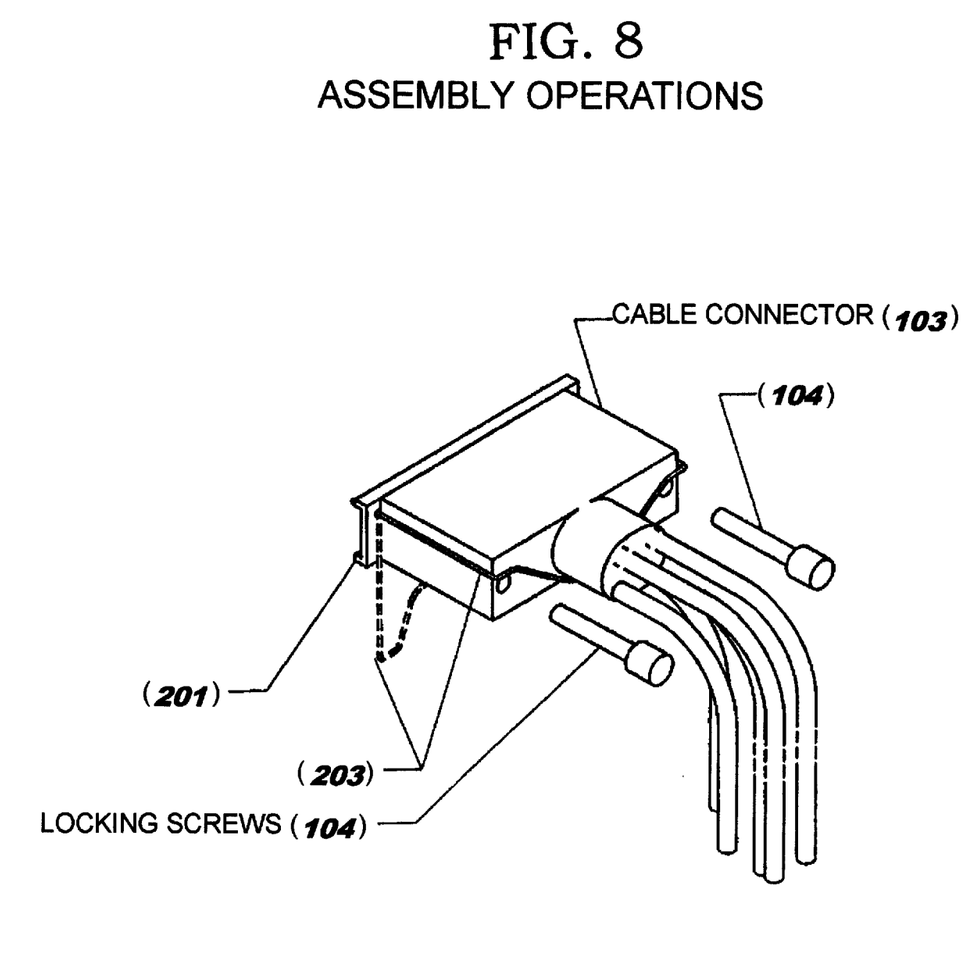
FIG. 8 shows a view in perspective of the Cable Connector with the Securing Plate and the Locking Spring according to the claimed invention.

As described in FIGS. 7 and 8, the installation of the Secure Plate on the connector comprises the steps of:

Unscrewing and removing both locking screws (104) from the Cable Connector (103).

Inserting short ends of locking spring (203) into dedicated holes (204) through the Securing Plate (201).

Inserting the Cable Connector (103) into the Securing Plate cut out (202).

Rotating the Locking Spring (203) by 90 degrees, up to fit against the cable bulk over-molding of the Cable Connector (103).

Re-installing both locking screws (104) on the Cable Connector (103).

Plugging the Cable Connector (103) assembly into the Adapter Card Connector (102).

Screwing both locking screws (104).

The Installation is now completed: Cable connector (103), Securing Plate (201), Chassis (105), Adapter Card Bracket (101) and Adapter Card Connector (102) are now tightly fastened, the air gap (108) does exist anymore and the proof against electromagnetic radiations is recovered. The risk for mechanical failures is also dramatically reduced.

In summary, the present invention relates to a connecting device (a securing plate) for improving the electro magnetic compatibility and mechanical rigidity of a connector assembly comprising:

a host machine chassis comprising at least one slot card connector mounted therein and at least one slot opening, an adapter card mounted in the at least one slot card connector and is assembled with:
an adapter card connector directed to the slot opening, and adapter card brackets for obturating the slot opening and ensuring an electro magnetic continuity with the host machine chassis, and
a cable connector to be inserted through the slot opening in said card adapter connector.

The connecting device is pressed, when the connectors are mated, by the front portion of the cable connector against the host machine chassis which in turn is pressed flat against the adapter card brackets. In a preferred embodiment the connecting device is attached on the front portion of a standard cable connector with removable fastening means, in particular with a locking spring. In another embodiment, the connecting device is an integral part of the cable connector.

Advantages

The present assembly allows a continuous contact all around the slot opening between the Adapter Card Connector and the chassis of the host machine which lowers the level of electromagnetic radiations and insures a constant quality in time. The Securing Plate enhances the rigidity of the overall mechanical assembly, hence dramatically reducing the risk for mechanical damage on the Adapter Card Printed Circuit Board. Here also, the reliability of the Adapter Card is significantly improved. The present invention can be implemented on already existing Adapter Cards and Cable connectors without any special tool and without any change or rework of any part involved. The invention is obviously adaptable to various connector types and dimensions and is thus widely usable and versatile. When specific connectors have to be designed, the invention is easily integrable and constitutes an intrinsic advantage for that connector.

We claim:

1. A machine assembly with improved magnetic characteristics comprising:

a host machine chassis (105) having at least one slot card connector mounted therein and at least one slot opening (111);

an adapter card (109) mounted in said at least one slot card connector inside said host machine chassis, said adapter card being assembled with:

an internal adapter card connector (102) directed to the slot opening (111) comprising a terminal part with electrical contacts; and adapter card brackets (101) for obturating the slot opening (111);

an external cable connector (103) comprising a terminal part with electrical contacts to be inserted through the slot opening into said internal card adapter connector; and a securing plate (201) inserted between the external cable connector (103) and the machine chassis (105), wherein when the external cable connector (103) and the internal card connector (102) are mated, said securing plate (201) is pressed by the external cable connector (103) against the host machine chassis (105) and transfers at least a portion of the force generated in mating the connectors to press the adapter card brackets (101) flat against the host machine chassis.

2. The machine assembly according to claim 1 wherein the pressure between the host machine chassis (105) and the adapter card brackets (101) is suitable for ensuring an electro magnetic contact all around the slot opening (111) between the adapter card brackets and the host machine chassis.

3. The machine assembly according to anyone of the preceding claims wherein the pressure between the host machine chassis (105) and the adapter card brackets (101) is suitable for ensuring a mechanical rigidity to the connector assembly.

4. The machine assembly according to claims 1 or 2 characterized in that the securing plate comprises a cut out (202) for allowing the insertion of the electrical contacts between the adapter card connector and the external cable connector.

5. The machine assembly according to claim 1 characterized in that the securing plate's external dimensions are roughly larger than the size of the slot opening (111) so as to ensure a significant pressure on the host machine chassis all around the slot opening.

6. The machine assembly according to claim 1 further including attaching means for attaching the securing plate to the external cable connector.

7. The machine assembly according to claim 6 wherein said attaching means (203) and said securing plate (201) are removable.

8. The machine assembly of claim 6 where in the attaching means including a locking spring.

9. The machine assembly according to claim 1 wherein said external cable connector (103) is a conventional or standard cable connector.

10. The machine assembly according to claim 1 characterized in that the securing plate is a part of the external cable connector.

11. The machine assembly set forth in claim 1 in which a locking spring is provided for fastening the securing plate to the external cable connector.

12. A connecting device for use in a connector assembly including:
- a host machine chassis having at least one slot card connector mounted therein and at least one slot opening,
- an adapter card mounted in the at least one slot card connector and assembled with:
  - an adapter card connector directed to the slot opening,
  - adapter card brackets for obturating the slot opening and ensuring an electro magnetic continuity with the host machine chassis; and
- an external cable connector to be inserted through the slot opening into said card adapter connector said connecting device including:
  - a securing plate for mounting between the external cable connector and the host machine chassis wherein when the external cable connector (103) and the internal card connector (102) are mated, said securing plate (201) is pressed by the external cable connector (103) against the host machine chassis (105) and transfers at least a portion of the force generated in mating the connectors to press the adapter card brackets (101) flat against the host machine chassis; and
  - a locking spring for coupling the securing plate to the external cable connector.

\* \* \* \* \*